United States Patent [19]

Caskey et al.

[11] 3,911,184

[45] Oct. 7, 1975

[54] PLASTIC OXYGEN BARRIERS

[75] Inventors: Terry L. Caskey, Concord; Robert O. Lindblom, Walnut Creek, both of Calif.

[73] Assignee: The Dow Chemical Company, Midland, Mich.

[22] Filed: Apr. 1, 1971

[21] Appl. No.: 130,544

Related U.S. Application Data

[62] Division of Ser. No. 816,806, April 16, 1969, abandoned.

[52] U.S. Cl. ............... 428/35; 428/341; 428/474; 428/515
[51] Int. Cl.² ................ B05B 5/02; B44D 1/092
[58] Field of Search ........... 117/47 A, 62, 62.1, 69, 117/106 R, 138.8 E, 138.8 UA, 94, 95, 118; 260/79.3 R, 85.5 S; 8/108

[56] References Cited
UNITED STATES PATENTS

| | | | |
|---|---|---|---|
| 2,400,720 | 5/1946 | Staudinger et al. | 117/118 |
| 2,727,831 | 12/1955 | Dixon et al. | 117/62.1 |
| 2,832,696 | 4/1958 | Walles | 117/69 |
| 2,832,697 | 4/1958 | Walles | 117/69 |
| 2,832,698 | 4/1958 | Walles | 117/69 |
| 2,832,699 | 4/1958 | Walles | 117/69 |
| 2,937,066 | 5/1960 | Walles | 8/4 |
| 3,072,619 | 1/1963 | Turbak | 260/79.3 |
| 3,328,367 | 6/1967 | Rees | 260/85.5 |
| 3,380,844 | 4/1968 | Menikheim et al. | 117/47 |
| 3,445,264 | 5/1969 | Haines | 117/47 |
| 3,578,484 | 5/1971 | Walles et al. | 117/47 |
| 3,613,957 | 10/1971 | Walles | 117/62.1 X |

*Primary Examiner*—Michael R. Lusignan
*Attorney, Agent, or Firm*—Michael S. Jenkins

[57] ABSTRACT

Composition of matter and plastic enclosure members having increased barrier properties to gases are provided by sulfonation and neutralization of the surface thereof. Polyamine sulfonate salts are generally more effective than metal salts. The sulfonated and neutralized enclosure members are useful to package gas sensitive materials, such as oxygen sensitive foodstuffs.

16 Claims, No Drawings ions 3,911,184

PLASTIC OXYGEN BARRIERS

CROSS-REFERENCES TO RELATED APPLICATIONS

This is a divisional application of application Ser. No. 816,806 filed Apr. 16, 1969, now abandoned.

BACKGROUND OF INVENTION

This invention relates to plastic or resinous enclosure members which have been chemically surfacetreated so that the transmission of gases through them is substantially reduced.

It is known from Canadian Pat. No. 713,477, and Belgium Pat. No. 642,138 that oxygen barrier films can be made by laminating several plies of polymers, one of which is a vinylidene chloride polymer. More recently, it has been discovered (U.S. Pat. No. 3,380,844) that good oxygen barrier films can be obtained if a polyolefin film is coated with an adhesive latex containing polyvinylidene chloride.

These prior art compositions suffer from the disadvantage that the multiply laminates are expensive and difficult to make while the dried latex coating of the coated polyolefins is not entirely satisfactory in its resistance to separation and/or cracking when the film is flexed.

SUMMARY OF INVENTION

It now has been found that polymer compositions having barrier properties to gases such as oxygen, air, and carbon dioxide can be made from sulfonatable polymers if the compositions after sulfonation are neutralized with an amino compound or is neutralized with inorganic bases and exchanged with metal salts. More specifically, it has been found that the sulfonated plastic compositions can be treated with polyamines or polyquaternary ammonium compounds to produce a surface or surface layer having a plurality of amino sulfonate salt groups which render the film substantially impervious to oxygen and like gases. Thus, the present invention is useful in that the products can be laminated to polyethylene film and used to wrap oxygen sensitive food materials such as processed meats, cheese and other gas sensitive materials.

DETAILED DESCRIPTION

The enclosure members of this invention are made from sulfonatable plastics or synthetic resins. Thus, this invention relates to compositions of matter and enclosure members substantially impermeable to the transmission of gases comprising a solid sulfonatable hydrocarbon polymer having the surface hydrogens thereof replaced by an amount of polyamine sulfonate salt groups sufficient to give improved gas barrier properties to said member. These salt groups can be selected from acyclic polyamine sulfonate salts, cyclic polyamine sulfonate salts, and polyquaternary ammonium sulfonate salts. The invention also relates to a method of packaging oxygen sensitive foodstuffs and a foodstuff package for these foodstuffs.

Not all plastics can be surface sulfonated since they must have a plurality of free hydrogen groups on the polymer surface or surface layer in order to undergo the desired sulfonation. An example is Teflon which has a plurality of fluorine atoms and no hydrogen atoms.

In general, the plastics to which this invention is applicable are sulfonatable thermoplastics. These are exemplified by the following groups or classes but it is to be understood that blends of the named plastics and copolymers of the related monomers are also included within the scope of this invention;

a. aromatic polymers such as polystyrene, polyvinyltoluene, poly(alphamethylstyrene), poly(phenylene), poly(p-xylylene), poly(phenylene oxide), poly(ethylene-terephthalate) and the like, b. polyolefins such as polyethylene, polypropylene, polyisobutylene, polybutene-1, poly(methylpentenes) and the like, c. polyacrylic esters such as poly(methyl acrylate), poly(ethyl methylacrylate) and the like, d. poly(vinyl esters) such as poly(vinyl acetate), poly-vinyl butyrate) and the like, e. polyvinylidene halides such as polyvinylidene chloride and polyvinylidene fluoride, f. halogenated polyolefins such as chlorinated polyethylene and chlorinated polypropylene, and g. polyvinyl halides such as polyvinyl fluoride and polyvinyl chloride.

For the purposes of this invention the term "enclosure members" is designed to be generic to bottles, boxes, tubs, envelopes, bags, pouches, and other containers having at least a portion of a wall member composed of a polymeric material having surface sulfonation and neutralization in accordance with this invention.

The method by which the polymers are sulfonated is not critical. Examples of prior art methods are set forth in U.S. Pat. Nos. 2,400,700, 2,793,964 and 2,879,177. The use of sulfur trioxide dissolved in an inert halogenated solvent suffers from the disadvantage that in some instances the solvent degrades or dissolves the polymer substrate as in the case of aromatic polymers such as polystyrene. It is preferred to use pure to dilute gaseous sulfur trioxide as the sulfonation reagent. If chlorosulfonic acid or sulfuryl chloride is used, the sulfonyl chloride groups which are formed are then hydrolyzed to sulfonic acid groups as is shown in U.S. Pat. No. 2,879,177.

The sulfonation reaction is continued generally until the amount of sulfonic acid groups on the surface ranges from about 0.0000075 to about 0.20 milligrams $SO_3$ per square centimeter of surface. It is to be understood that the term "surface" includes some of the underlying material since the sulfonation penetrates to a depth of several microns. Thus, "surface" is intended to include a surface layer. The concentration of the sulfur trioxide, time, pressure, and temperature are interrelated factors which determine the degree of sulfonation and how fast it is obtained. For example, the sulfur trioxide ($SO_3$) can be diluted with any inert gas such as air, nitrogen, carbon dioxide, sulfur dioxide, etc., and a 5 percent concentration of $SO_3$ in one of these gases for 5 minutes at 23°C. and atmospheric pressure gives approximately the same degree of sulfonation as 30 seconds exposure to pure $SO_3$ at the same temperature and pressure. Similar changes in these variables can be made by those skilled in the art.

The sulfonated polymers prepared as set forth above which contain a plurality of sulfonic acid groups are then converted into sulfonic acid salt groups by contacting the sulfonated polymers with (1) aqueous solutions of alkali metal bases and then exchanging them with aqueous solutions of various metal salts or (2) with aqueous solutions of polyamines.

Metal salts used are, in general, alkali metal and heavy metal salts. The metal salts that are preferred are water soluble salts of magnesium, copper, silver, zinc and nickel.

The polyamines used to make the sulfonic salt groups can be any one of three general types; acyclic polyamines, cyclic polyamines, and polyquaternary amines. The acyclic polyamines used are exemplified by ethylene diamine, diethylenetriamine, triethylenetetramine, tetramethylenediamine, hexamethylenediamine, polyethyleneimine, poly(1,2-propyleneimine), poly(1,2-butyleneimine), poly(2,2-dimethylethyleneimine), poly(2,3-butyleneimine), polytrimethyleneimine and the like. The cyclic polyamines used are exemplified by diethylene diamine (piperazine), triethylenediamine, 1,-4-cyclohexanediamine,hexamethylene-tetramine, 1,1-cyclohexanediamine, p-phenylenediamine, polyvinylpyridine, 2,3-tolylenediamine and the like. The polyquaternary amines are illustrated by poly (vinylbenzyltrimethyl ammonium hydroxide), poly(vinyltolyltriethyl ammonium hydroxide) and the like.

The foregoing treated plastics having a plurality of sulfonate salt groups are used to package oxygen sensitive foodstuffs such as processed meats, cheese and coffee by laminating a film of the treated plastic to a heat sealable film such as polyvinylchloride or polyethylene. For example, a pouch can be formed by conventional means from a one mil thick film of polystyrene which has been sulfonated with 5 percent $SO_3$ in dry nitrogen for 5 minutes and treated with a 2 percent aqueous solution of polyethyleneimine in accordance with this invention and to which is laminated a 1 mil film of polyethylene. The pouch is formed with the polyethylene on the inside, sliced cheese is placed therein and the opening is heat sealed. It is found that the storage life of the packaged cheese is excellent. In like manner, roasted peanuts and sliced bologna can be packaged with equivalent results. Alternatively, the treated film can be used as a transparent cover for a foodstuff container having a gas impervious bottom wall and sidewalls. For example, a molded tray of aluminum foil can be substantially filled with sliced bologna and a laminated film of polyethylene and polyethyleneimine-treated sulfonated polystyrene can be heat sealed across the top thereof with the polyethylene on the inside.

The invention is further illustrated by the following examples which are to be considered to illustrate and not limit the invention. The oxygen gas transmission rate in each of the examples which is the permeance of the particular film sample was determined by the gas chromatograph method set forth by T. L. Caskey in Modern Plastics, Vol. 45 No. 4, pages 148, 153, 154, 191, December 1967, which is incorporated by reference herein. This method was chosen because the results are substantially equivalent to the standard method ASTM D-1434-63 but they are obtained more rapidly with less likelihood of errors due to failure of the edge seals.

The gas transmission rate, (GTR) of the films to oxygen is reported in cubic centimeters/100 square inches/24 hours/atmosphere at 23°C.

EXAMPLE 1

A 1 mil thick film of polystyrene, 6 × 6 inches square, is suspended in a vacuum desiccator and evacuated to about 1 torr. Dry sulfur trioxide ($SO_3$) gas is then admitted to a pressure of 200 torr, and this pressure is maintained for 1 minute at 25°C. After the $SO_3$ is pumped out, air is admitted, and the film is water-washed to remove excess $SO_3$. The film is then immersed in a 5 percent aqueous solution of the bases of Table I for 5 minutes, water-washed, dried, and the oxygen gas transmission rate ($O_2$ G.T.R.) measured by the foregoing method of Caskey.

Table I

| Base | $O_2$ G.T.R. |
|---|---|
| None (unsulfonated control) | 210.0 |
| None (sulfonated control) | 90.0 |
| LiOH | 0.405 |
| NaOH | 3.24 |
| $NH_4OH$ | 50.5 |
| KOH | 10.0 |
| $Ba(OH)_2$ | 1.73 |
| $Ca(OH)_2$ | 1.9 |

EXAMPLE 2

Samples of polystyrene similar to those of Example 1 are sulfonated at 23°C in a glass chamber into which a stream of $SO_3$ vapor in dry nitrogen is admitted at the concentration and time interval set forth in Table II.

The sulfonated films are then water-washed and completely neutralized by dipping them in a one normal aqueous solution of the bases of Table II for 3 minutes at 25°C.

The neutralized films are then treated with a one molar solution of the metal salts set forth in Table II dried, and tested in the manner of Example 1.

EXAMPLE 3

In a manner similar to Example 2, polystyrene film samples are sulfonated, washed with water and then immersed in a 2 percent by weight water solution of the amines set forth in Table III for 1 minute at 25°C, washed, dried and tested for oxygen permeability.

Table II

| Percent Concentration $SO_3$ | Sulfonation time in min. | Neutrolization agents | Exchange Agents | $O_2$ G.T.R.* |
|---|---|---|---|---|
| None(control) | None | None | None | 283.0 |
| 57 | 1 | None | None | 58.0 |
| 57 | 1 | LiOH | None | 2.3 |
| 57 | 1 | NaOH | $MgCl_2$ | 0.96 |
| 57 | 1 | NaOH | $FeCl_3$ | 12.0 |
| 57 | 1 | NaOH | $FeCl_2$ | 10.7 |
| 5 | 5 | NaOH | $Fe(NO_3)_3$ | 26.0 |
| 57 | 1 | NaOH | $AgNO_3$ | 0.35 |
| 57 | 1 | NaOH | $SnCl_4$ | 15.3 |
| 57 | 1 | NaOH | $ZnCl_2$ | 1.07 |
| 5 | 5 | NaOH | $Ni(NO_3)_2$ | 0.318 |
| 5 | 5 | NaOH | $SrCl_2$ | 14.3 |
| 5 | 5 | NaOH | $SnCl_2$ | 40.5 |
| 57 | 1 | NaOH | $Cu(NO_3)_2$ | 0.41 |
| 17 | 1 | NaOH | $Cu(NO_3)_2$ | 1.95 |
| 17 | 2 | NaOH | $Cu(NO_3)_2$ | 1.26 |
| 17 | 5 | NaOH | $Cu(NO_3)_2$ | 0.80 |
| 5 | 1 | NaOH | $Cu(NO_3)_2$ | 3.88 |
| 5 | 5 | NaOH | $Cu(NO_3)_2$ | 1.15 |

*Oxygen gas transmission rate.

Table III

| Percent Concentration of $SO_3$ | Sulfonation time in min. | Neutraliza- | $O_2$ |
|---|---|---|---|
| 5 | 5 | ethylene diamine | 8.3 |
| 5 | 5 | ethylamine | 123.0 |
| 5 | 5 | polyethyleneimine (mol. wt. 2000) | 0.25 |
| 5 | 5 | polyethyleneimine (mol. wt. 40,000 to 60,000) | 4.9 |
| 5 | 5 | polyvinylbenzyltrimethylammonium hydroxide (mol. wt. 100,000 1% solution) | 15.7 |
| 5 | 5 | hexamethylene-tetramine | 14.0 |
| 5 | 5 | diethylenetriamine | 10.6 |

*Oxygen gas transmission rate.

EXAMPLE 4

Several 1 mil pieces of 6 × 6 inch polyethylene (density 0.9184) are sulfonated in a 1 percent solution of $SO_3$ in methylene chloride at 25°C for 5 minutes. The films are then neutralized and exchanged with various solutions in a manner similar to Example 2 and tested for their oxygen transmission rate. The results are given in Table IV Table IV

| Neutralization Agents | Exchange Agents | $O_2$ – G.T.R.* |
|---|---|---|
| None-unsulfonated control | None | 250.0 |
| None-sulfonated control | None | 35.0 |
| Bleached with sodium hypochlorite | None | 39.6 |
| Bleached with sodium hypochlorite and neutralized with LiOH | None | 28.0 |
| LiOH (not bleached) | Ni(NO$_3$)$_2$ | 17.0 |
| NaOH (not bleached) | Ni(NO$_3$)$_2$ | 12.6 |

*Oxygen gas transmission rate.

EXAMPLE 5

In a manner similar to Example 2, 6 × 6 inch samples of 3.5 mil polyvinylchloride having 3.2 percent of an aliphatic ester as a plasticizer are sulfonated with 5 percent $SO_3$ in a dry nitrogen stream for 2 minutes at 25°C. The sulfonated films are water washed and immersed in a one normal sodium hydroxide solution for 3 minutes at 25°C. The results are shown below.

| Sample | $O_2$–G.T.R. |
|---|---|
| Control | 1.41 |
| Sulfonated Only | 2.46 |
| Sulfonated and Neutralized | 0.71 |

Similar reductions in the transmission of other gases are obtained by this invention. Thus, the transmission of gases such as carbon dioxide, air, and nitrogen are also reduced. Surprisingly, the moisture barrier properties of the enclosure member of this invention are substantially not altered by the chemical treatment herein disclosed.

We claim:

1. An enclosure member substantially impermeable to the transmission of gases comprising a solid sulfonatable aromatic polymer having a plurality of free hydrogen atoms attached to the carbon atoms thereof, said member having an inner and outer surface, at least one of said surfaces having a portion of the hydrogen atoms thereof replaced by an amount of polyamine sulfonate salt groups sufficient to give improved gas barrier properties to said member.

2. The enclosure member as set forth in claim 1 in which the polyamine sulfonate salt groups are selected from the group consisting of acyclic polyamine sulfonates, cyclic polyamine sulfonates and polyquaternary ammonium sulfonates.

3. The enclosure member as set forth in claim 1 in which the amount of polyamine sulfonate salt groups is equivalent to from about 0.000075 to about 0.20 milligrams of sulfur trioxide per square centimeter of surface.

4. The enclosure member as set forth in claim 3 in which the polyamine sulfonate salt group is an acyclic polyamine sulfonate salt.

5. The enclosure member as set forth in claim 3 in which the polyamine sulfonate salt group is a cyclic polyamine sulfonate salt.

6. The enclosure member as set forth in claim 3 in which the polyamine sulfonate salt group is a polyquaternary ammonium sulfonate salt.

7. The enclosure member as set forth in claim 4 in which the acyclic polyamine is polyethyleneimine.

8. The enclosure member as set forth in claim 4 in which the polyamine is ethylene diamine.

9. The enclosure member as set forth in claim 5 in which the polyamine is hexamethylenetetramine.

10. The enclosure member as set forth in claim 6 in which the polyquaternary ammonium sulfonate is polyvinylbenzyltrimethylammonium hydroxide.

11. A method of packaging gas sensitive materials which comprises interposing between said materials and the atmosphere a film of a solid sulfonatable aromatic polymer having the surface hydrogens thereof replaced by an amount of polyamine sulfonate salt groups sufficient to give increased gas barrier properties to said film.

12. The method of claim 11 wherein the aromatic polymer is poly(ethylene-terephthalate).

13. The method of claim 12 wherein the aromatic polymer is polystyrene.

14. The enclosure member of claim 1 wherein the aromatic polymer is polystyrene.

15. The enclosure member of claim 1 wherein the aromatic polymer is poly(phenylene oxide).

16. The method of claim 11 wherein the amount of polyamine sulfonate salt groups is equivalent to from about 0.000075 to about 0.20 milligrams of sulfur trioxide per square centimeter of surface.

* * * * *